Figure 5:
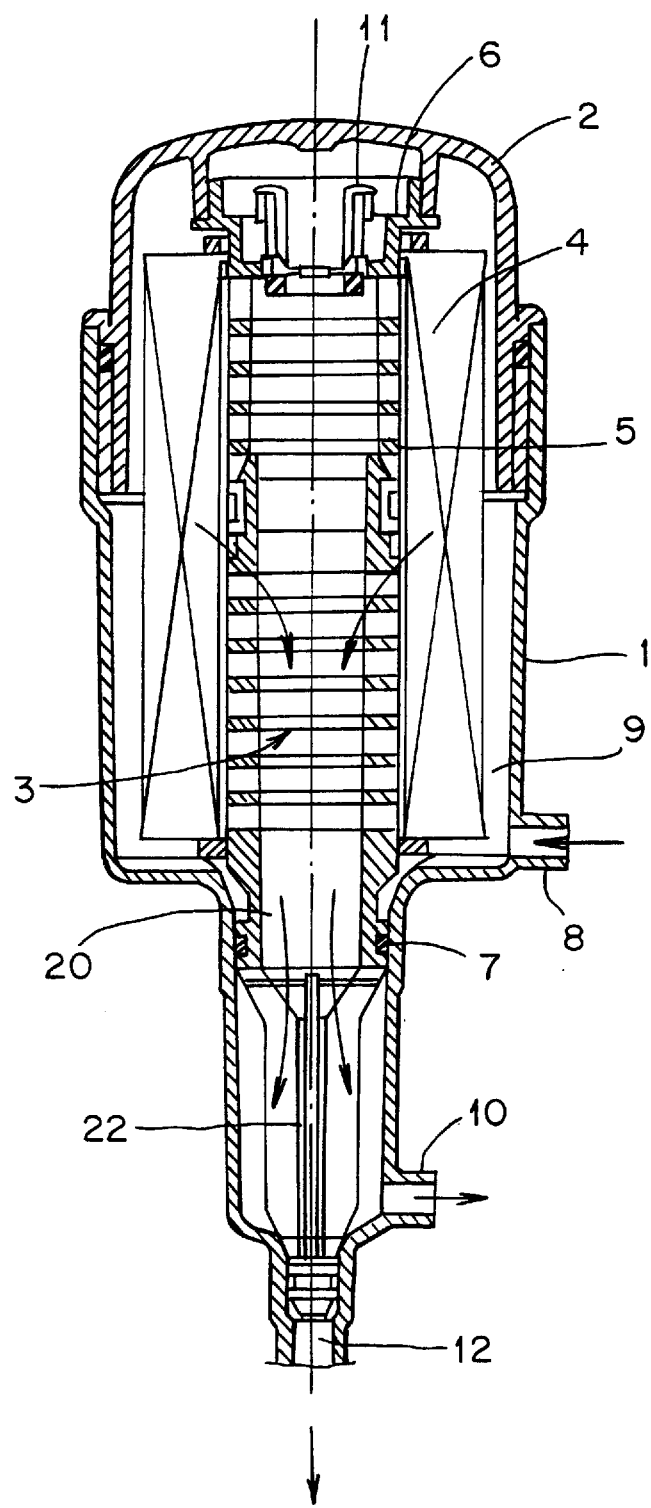

United States Patent
Bruss et al.

[11] Patent Number: 5,814,215
[45] Date of Patent: Sep. 29, 1998

[54] OIL FILTER INCLUDING AN INTEGRAL FILTER SUPPORT AND HOUSING DRAIN VALVE ASSEMBLY

[75] Inventors: Elke Bruss, Asperg; Hans Jensen, Kirchheim/Teck; Rolf Möhle, Bretzfeld, all of Germany

[73] Assignee: Knecht Filterwerke GmbH, Stuttgart, Germany

[21] Appl. No.: 776,866

[22] PCT Filed: Jun. 12, 1996

[86] PCT No.: PCT/DE96/01027

§ 371 Date: Feb. 11, 1997

§ 102(e) Date: Feb. 11, 1997

[87] PCT Pub. No.: WO97/00112

PCT Pub. Date: Jan. 3, 1997

[30]   Foreign Application Priority Data

Jun. 17, 1995  [DE]  Germany .................. 195 22 023.4

[51] Int. Cl.⁶ ..................................................... B01D 35/34
[52] U.S. Cl. .......................... 210/130; 210/132; 210/248; 210/428; 210/429; 210/440; 210/442; 210/457
[58] Field of Search .............................. 210/130, 132.248, 210/440, 441, 442, 457, 454, 450, 428–430; 184/6.24

[56]   References Cited

U.S. PATENT DOCUMENTS 5,516,425  5/1996  Brieden et al. ..................... 210/232
5,589,060  12/1996  Gebert et al. ....................... 210/232

FOREIGN PATENT DOCUMENTS

| 0 547 291 | 6/1993 | European Pat. Off. . |
| 0 612 549 | 8/1994 | European Pat. Off. . |
| 0 653 234 | 5/1995 | European Pat. Off. . |
| 43 03 694 | 8/1994 | Germany . |

*Primary Examiner*—Matthew O. Savage
*Attorney, Agent, or Firm*—Collard & Roe, P.C.

[57]   ABSTRACT

A lubricating oil filter for internal combustion engines is disclosed herein. The oil filter includes a vertical housing closed at the top by a screw cover and includes a filter support rotatably mounted on the screw cover for removably supporting an annular filter element. The filter support includes a valve element at a bottom end thereof for closing an additional outlet port at the bottom of the housing when the cover and filter support are installed on the housing and for opening the additional outlet port when the cover and filter support are removed from the housing.

10 Claims, 4 Drawing Sheets

FIG. 1
FIG. 2
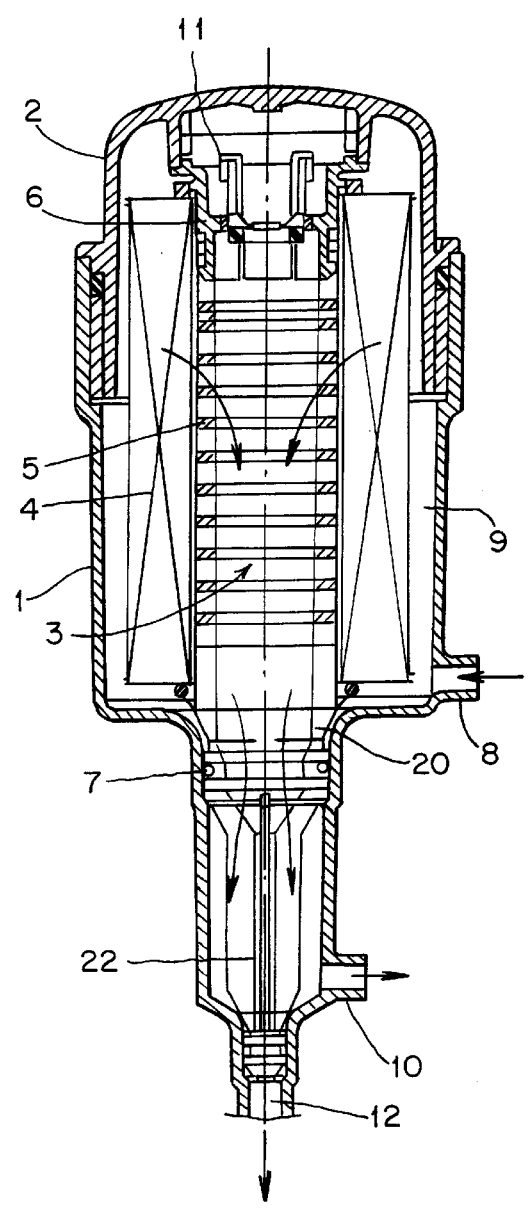
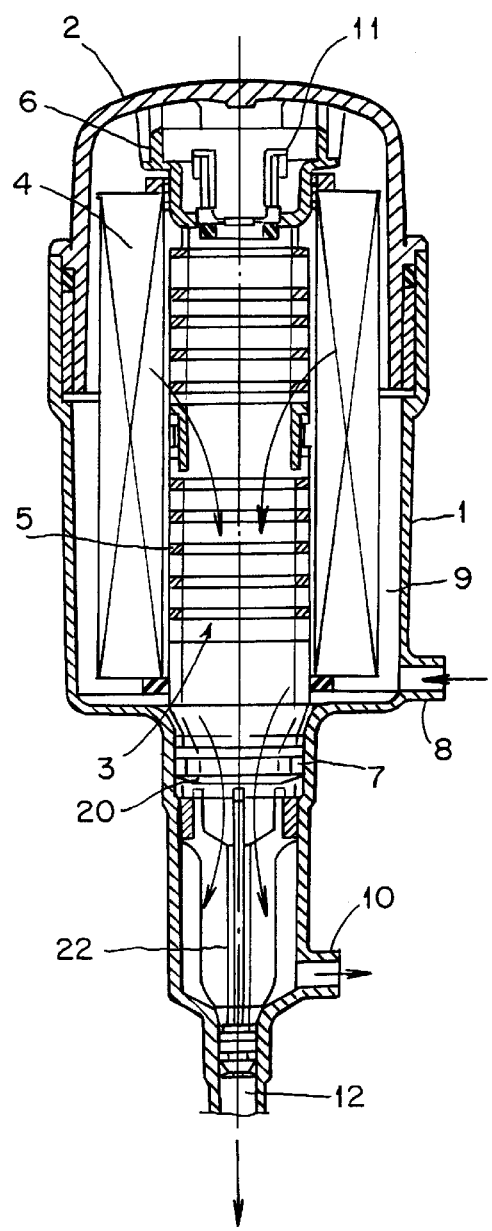

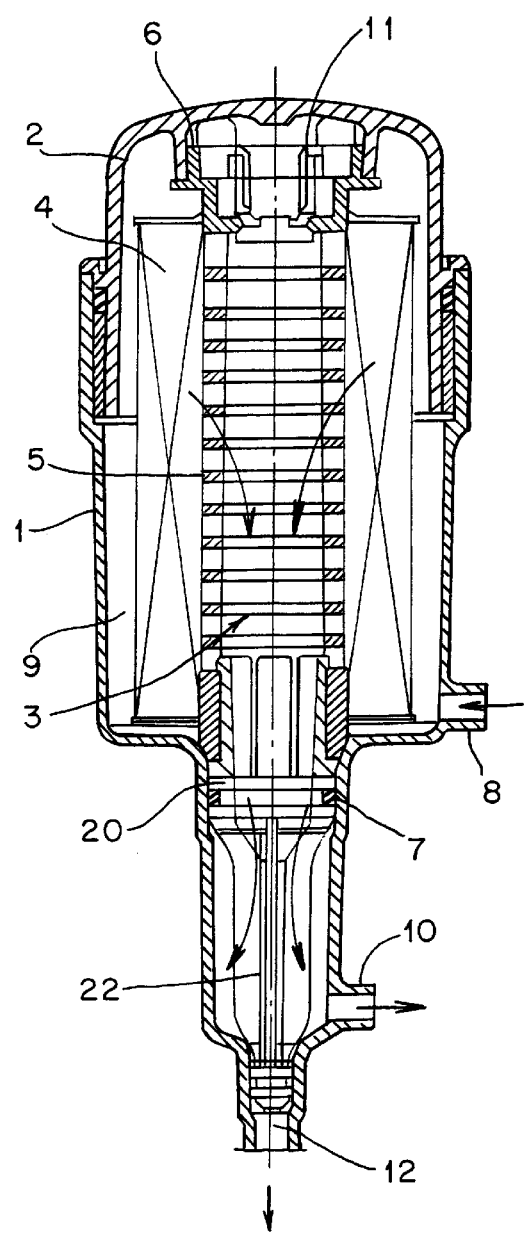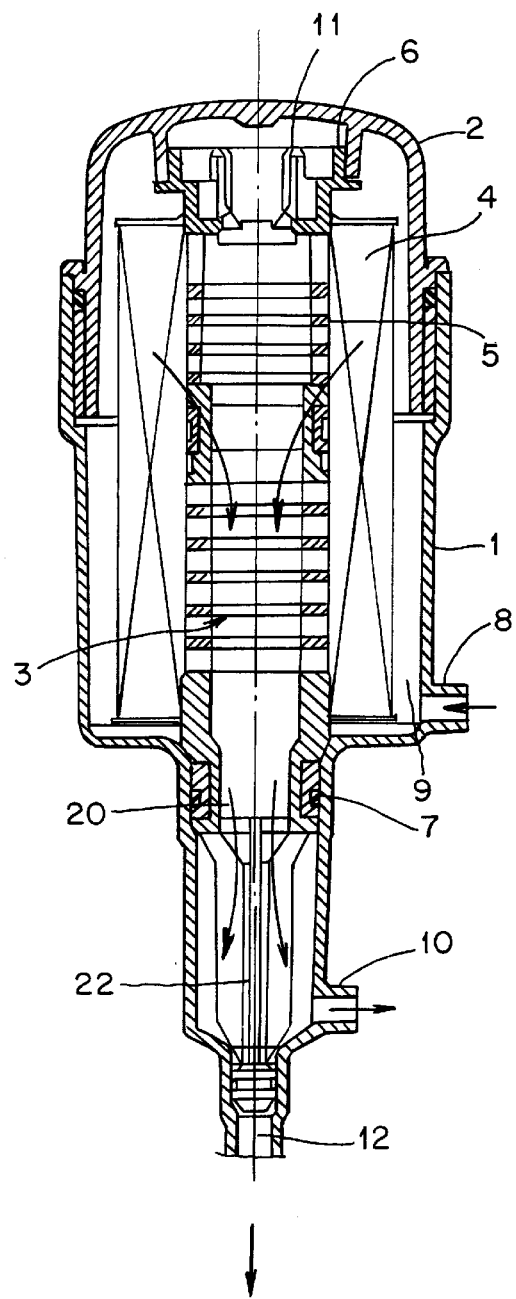

OIL FILTER INCLUDING AN INTEGRAL FILTER SUPPORT AND HOUSING DRAIN VALVE ASSEMBLY

The invention relates to a lubricating-oil filter for internal combustion engines, in particular, in accordance with the features of the precharacterizing clause of Patent Claim 1.

An oil filter of this kind is known from EP 06 12 549 A2.

DE 41 31 353 A1 has disclosed an oil filter with a full-flow filter insert and a partial-flow filter insert, in which the two inserts are mounted detachably on a support mounted rotatably in the screw cover of this filter. In this filter, the support does not interact with an additional outlet port in such a way that the said port is closed with the cover closed and open with the cover open. Moreover, one of the two filter inserts, which is there composed, in particular, of folded filter-web material, is supported in an insufficiently firm manner radially at the inside over its entire length.

Taking this as a starting point, the invention is concerned with the problem of simplifying the structure of a filter derived from the generic type defined in the first-mentioned publication EP 06 12 549 A2, to improve its operation and, in addition, to ensure that the filter insert is well supported radially at the inside. The provision of good support of the filter insert radially at the inside is intended to improve its life, which is determined by strength.

A fundamental solution to this problem is achieved by means of an embodiment of the lubricating-oil filter of the relevant generic type in accordance with the characterizing features of Patent Claim 1.

The invention is based on the idea of supporting the annular filter insert solely on the support and, at the same time, of designing the support extending from the screw cover to the bottom of the filter-housing cup as a permeable tube in the region of the filter insert between its ends, the design being such that this tube can be used as a supporting core for the internal radial support of the annular filter insert.

Expedient configurations of the invention are the subject-matter of the subclaims and are explained in greater detail with reference to various exemplary embodiments.

Exemplary embodiments of the invention are illustrated in the drawing.

All the figures show an essentially schematic representation of a filter housing in longitudinal section. The difference between the individual embodiments consists essentially only in the various ways in which the support is divided in the longitudinal direction.

The following divisions are shown in the individual figures.

Figure 6:
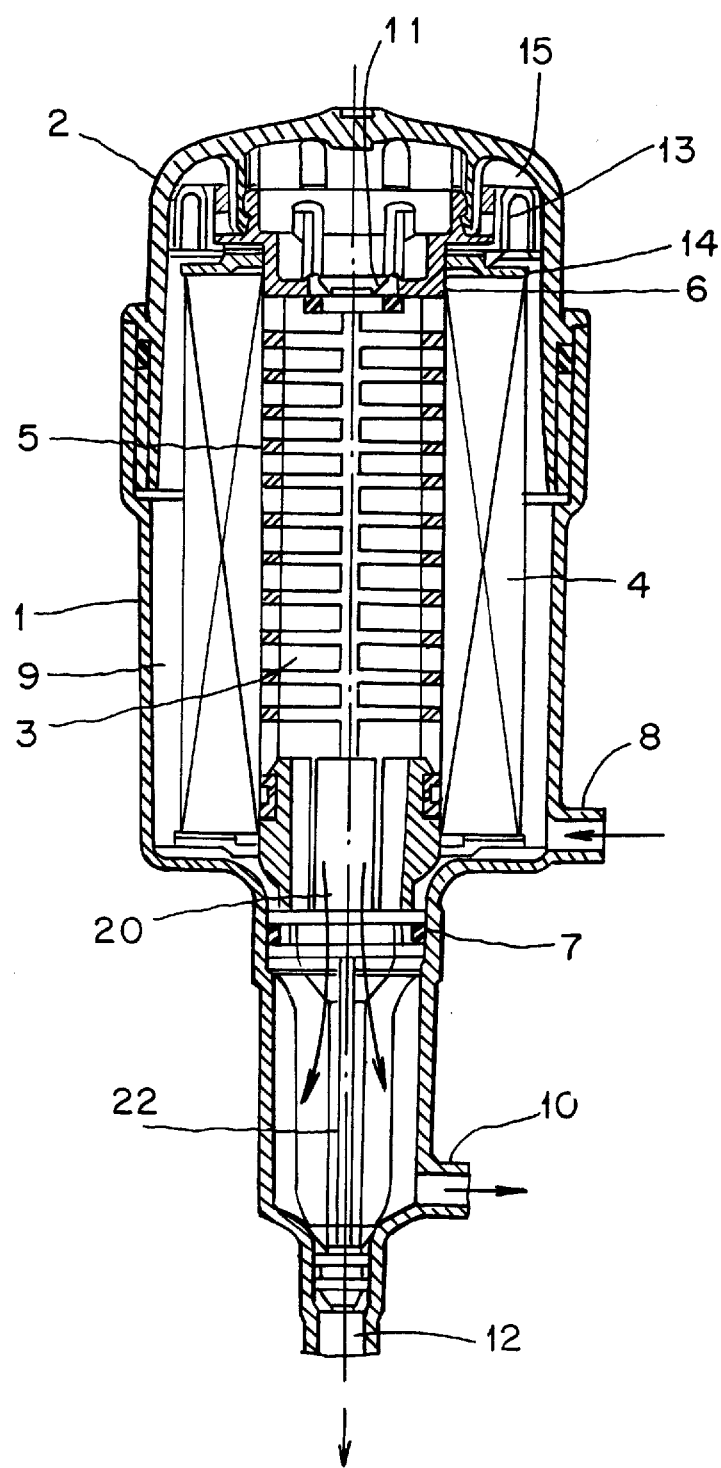

FIG. 1: the support comprises a bottom part, extending over almost the entire length, and a snapped-on cap, FIG. 2: the support is divided into three parts latched together, FIG. 3: the support comprises a top part with a cap and a bottom part latched to the said top part, FIG. 4: the support comprises three individual parts latched together, FIG. 5: the support is divided into two with a division somewhat above the centre of the filter insert, FIG. 6: the support is made up of a top part and a bottom part, which are latched to one another at the level of the lower end of the filter insert, the upper end of the support surrounding an annular filter screen.

The filter housing comprises a filter-housing cup 1 which is open at the top and can be closed by means of a screw cover 2. In the region of the bottom, the filter-housing cup 1 is drawn in in the manner of a bottleneck.

A support 3 is mounted rotatably in the screw cover 2 by way of a latch-type fastening and accommodates an annular filter insert 4. In the region in which it is surrounded by the filter insert 4, between the ends of the latter, the support 3 is designed as a radially permeable supporting tube 5 against which the annular filter rests radially from the inside. At the top, at the end facing the screw cover 2, the supporting tube 5 is closed axially in a leak-tight manner by a cap 6. In the region of the lower end of the annular filter insert 4, the supporting tube 5 is of radially impermeable design. At its upper end, the annular filter insert 4 rests in a radially leak-tight manner against the cap 6 and, at its lower end, rests in a radially leak-tight manner in the radially impermeable region of the supporting tube 5.

In the bottom region of the filter-housing cup 1, the said bottom region being drawn in in the manner of a bottleneck, a radially impermeable region 20 of the supporting tube 5, which projects beyond the lower end of the filter insert 4, is sealed relative to the filter-housing cup 1 by a ring seal 7. There is a drain valve means 22 which is attached to the supporting tube at a point on the impermeable region 20 of the supporting tube.

The lubricating oil to be cleaned enters, via an inlet port 8, an outer space 9 which surrounds the filter insert 4 radially. From this outer space 9, the oil flows through the annular filter insert into the central space of the latter within the supporting tube 5 and leaves the filter-housing cup 1 as cleaned oil via an outlet port 10. The outer space 9 is thus the dirty space of the filter and the region which lies within the filter insert 4 and extends downwards into the bottleneck-shaped extension of the filter-housing cup 1 is the clean space. The clean space and the dirty space of the filter are separated from one another by the ring seal 7, the radially impermeable region of the supporting tube 5 being part of the dividing wall between the clean space and the dirty space. In its permeable region, which lies within the filter insert 4, the supporting tube 5 is designed in such a way that it can serve as an internal supporting core for the filter insert.

An overflow valve 11 is built into the cap 6.

Provided in the bottleneck-like bottom region of the filter-housing cup 1 is an additional outlet port 12, which is closed by the free end of the support 3 when the screw cover 2 is closed.

When the screw cover 2, which is rotatably linked to the support 3, is opened, the additional outlet port 12 is automatically opened since the closure piece of the support 3 slides out of the open aperture of this additional outlet port 12.

Removing the support 3 from the filter-housing cup 1 also opens the seal between the clean space and dirty space provided by the sealing ring 7, allowing cleaned and uncleaned oil to flow out through the additional outlet port 12 together.

In order to be able to manufacture the support in a simple manner from plastic, for example, it is divided one or more times over its length. The individual separate sections are latched together by means of spring tongues and counter-bearings. The divisions and methods of latching are illustrated in the individual figures and are shown with sufficient clarity there to be comprehensible without further explanation.

In the embodiment according to FIG. 6, an annular screen filter 13 is provided at the upper end of the supporting tube 5, between the latter and the peripheral wall of the screw cover 2. The said filter serves as a coarse filter for any lubricating oil which flows through the overflow valve 11. The screen filter 13 is composed overall of flexible plastic with filter areas reinforced by webs and has the shape of a ring with a U shaped cross-section. By means of its U legs, which are aligned parallel to the filter axis, the screen filter 13 is clamped leak-tightly clasp-fashion between the upper end disc 14 of the filter insert 4 and the peripheral wall of the screw cover 2. The screen filter 13 can be snapped axially in the manner of an undercut onto an annular collar of the end disc 14 by means of its radially inner U leg. This makes it possible to handle and install the screen filter 13 as part of the filter insert 4. Within the screw cover 2, the screen filter 13 can also be supported axially on the end of the screw cover 2 by radial ribs 15.

We claim:

1. A lubricating oil filter for internal combustion engines comprising:

a filter housing cup including an open top, a sidewall, a bottom wall, an inlet adjacent said bottom wall, an outlet tube extending from said bottom wall, said outlet tube having an interior surface and first and second outlet ports, wherein said first outlet port is located at a lower end of said outlet tube and said second outlet port is positioned above said first outlet port;

a screw cover for closing the open top of said filter housing cup;

a filter support disposed within said filter housing cup, the filter support having a first end that is rotatably connected to said screw cover by a connecting means and a second end including a valve member that sealingly engages said first outlet port when said cover fully closes the open top of said filter housing, wherein said filter support includes a tubular upper imperforate section adjacent said cover and a tubular lower imperforate section that removably and sealingly engages an upper portion of the interior surface of said outlet tube at a location above said first and second outlet ports, said filter support including a first radially permeable section disposed between the tubular upper and lower imperforate sections of said filter support, said filter support including a second radially permeable section disposed on said tubular lower imperforate section and connected to the valve member for permitting flow from an interior of said tubular perforated section to said second outlet port via said lower tubular imperforate section, wherein said tubular upper and lower imperforate sections and said first and second radially permeable sections and said valve member are integrally connected together so that said filter support can be removed from said housing cup as an integral unit;

filtering means surrounding the first radially permeable section of said support tube, means for removably sealing an upper end of the filtering means to said tubular upper imperforate portion of the support tube, and means for removably sealing a lower end of said filtering means to the tubular lower imperforate portion of said support tube;

whereby said screw cover and said filter support including said valve member can be removed from said filter housing cup as an integral unit, and whereby removal of said integral unit from said filter housing cup removes said valve member from said first outlet port to permit oil to drain from said filter housing via said first outlet port.

2. Oil filter according to claim 1, wherein the filter support (3) comprises as seen over its axial length, individual elements having means to be latched together.

3. Lubricating-oil filter according to claim 1 comprising an overflow valve (11) built in a cap (6) disposed at a top of the tubular upper imperforate section of the filter support (3).

4. Lubricating-oil filter according to claim 3, comprising the overflow valve (11) has arranged upstream thereof in the screw cover (2) supporting the support (3), an annular filter screen (13) with a U-shaped cross section which is clamped leak-tightly radially between a peripheral wall of the screw cover (2) and an upper end disc defining the sealing means at the upper end of said filtering means by means of U-members having legs extending in parallel alignment to a longitudinal axis of the filtering means.

5. Lubricating-oil filter according to claim 4, comprising means for latching the filter screen (13) in an axially fixed manner to the end disc (14) of the filter insert (4).

6. Lubricating-oil filter according to claim 5, comprising the latching means is provided at an encircling annular shoulder on the end disc (14).

7. Lubricating-oil filter according to claim 1, comprising the support (3) having a cross-shaped cross-section in the radially permeable region which is situated between the radially impermeable, axially bounded region of the supporting tube (5) and the free end of that support (3), which is closing the additional outlet port (12) at the bottom of the filter housing cup (1), when the cover (2) is closed.

8. A lubricating oil filter for internal combustion engines comprising:

a filter housing cup including an open top, a sidewall, a bottom wall, an inlet adjacent said bottom wall, an outlet tube extending from said bottom;

a screw cover for closing the open top of said filter housing cup;

a filter support disposed within said filter housing cup, the filter support having a first end that is rotatably connected to said screw cover by a connecting means, wherein said filter support includes a tubular upper imperforate section adjacent said cover and a tubular lower imperforate section that removably and sealingly engages an upper portion of the interior surface of said outlet tube, said filter support including a first radially permeable section disposed between the tubular upper and lower imperforate sections of said filter support;

filtering means surrounding the first radially permeable section of said support tube, an upper end disk for removably sealing an upper end of the filtering means to said tubular upper imperforate portion of the support tube, and a lower end disk for removably sealing a lower end of said filtering means to the tubular lower imperforate portion of said support tube;

an overflow valve built in a cap disposed at a top of the tubular upper imperforate section of the filter support;

wherein the overflow valve has arranged upstream thereof, in the screw cover supporting the support, an annular filter screen with a U-shaped cross section which is clamped leak-tightly radially between a peripheral wall of the screw cover and said upper end disc by means of U-members having legs extending in parallel alignment to a longitudinal axis of the filtering means.

9. Lubricating-oil filter according to claim 8, comprising means for latching the filter screen (13) in an axially fixed manner to the end disc (14) of the filtering means (4).

10. Lubricating-oil filter according to claim 9, comprising the latching means is provided at an encircling annular shoulder on the end disc (14).

* * * * *